Feb. 6, 1934. A. E. SMITH 1,945,985
MANUFACTURE OF BOTTLES AND OTHER ARTICLES IN GLASS AND APPARATUS THEREFOR
Filed Sept. 29, 1932 4 Sheets-Sheet 1
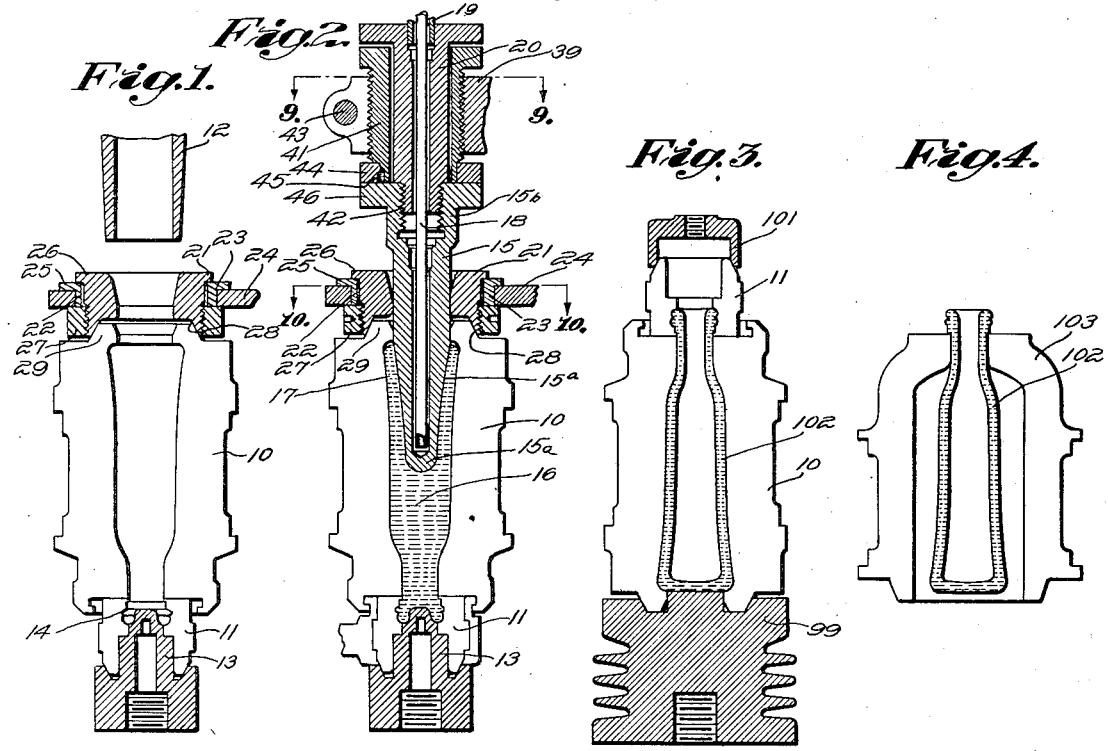
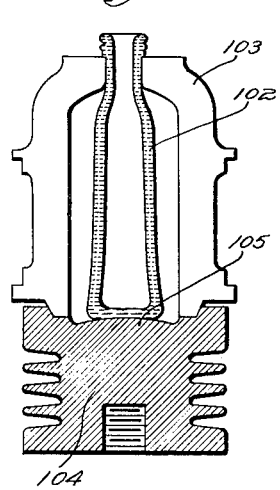
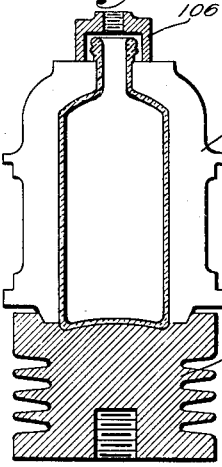
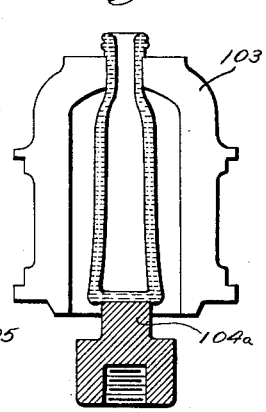
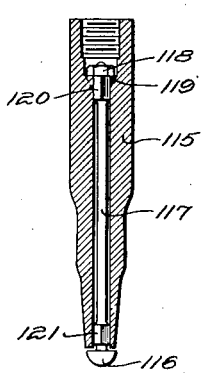
Witness:
Benj. X. Bartman
Inventor
Arthur Edgar Smith
by Brown & Parham
Attorneys

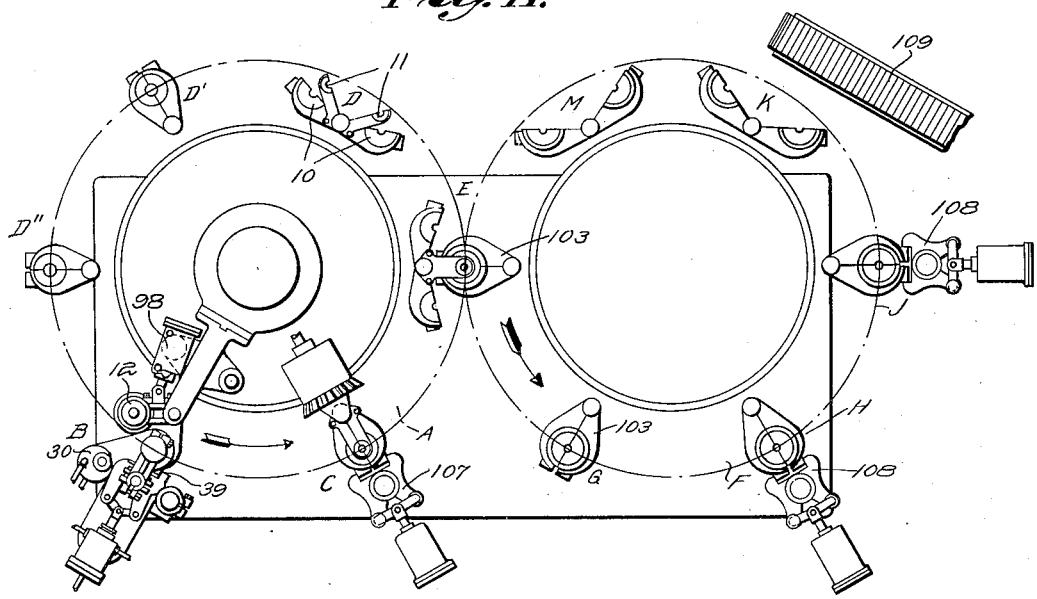
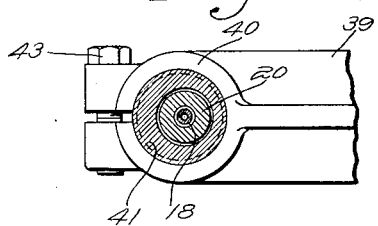
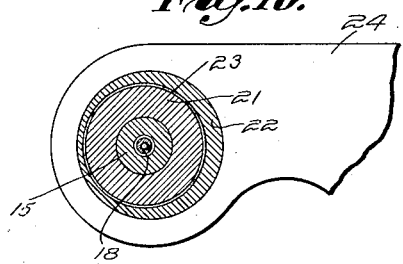
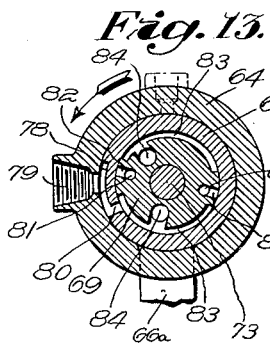
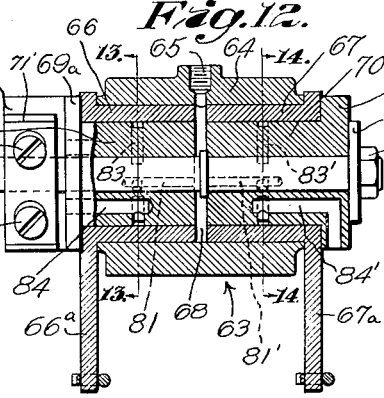
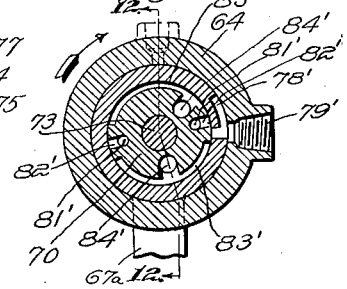

Feb. 6, 1934.    A. E. SMITH    1,945,985
MANUFACTURE OF BOTTLES AND OTHER ARTICLES IN GLASS AND APPARATUS THEREFOR
Filed Sept. 29, 1932    4 Sheets-Sheet 3
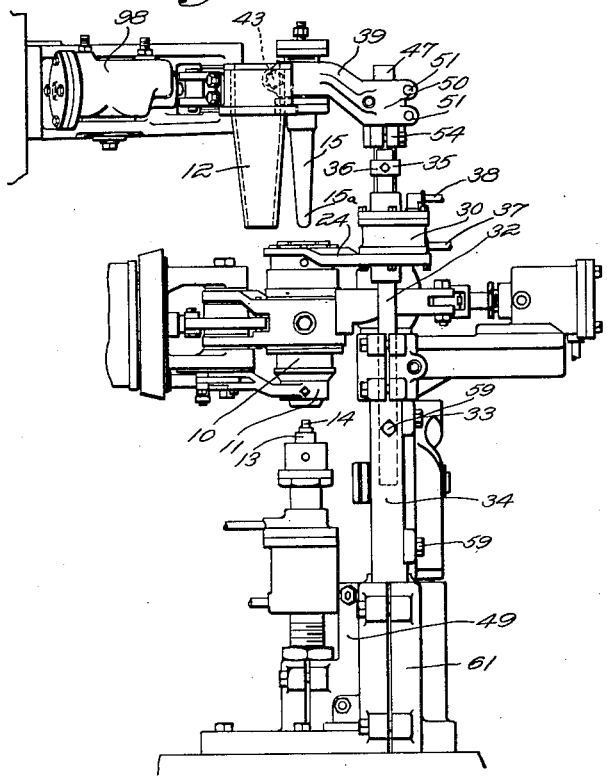
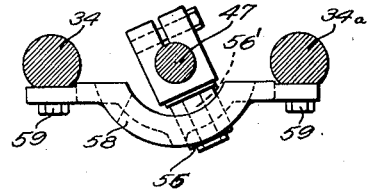
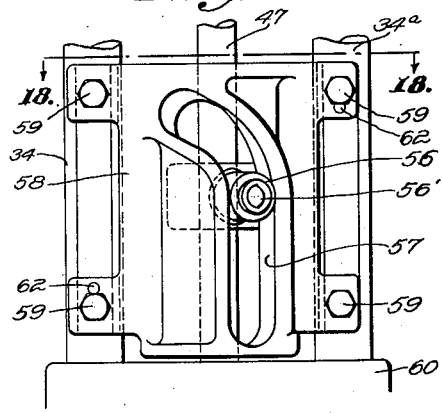
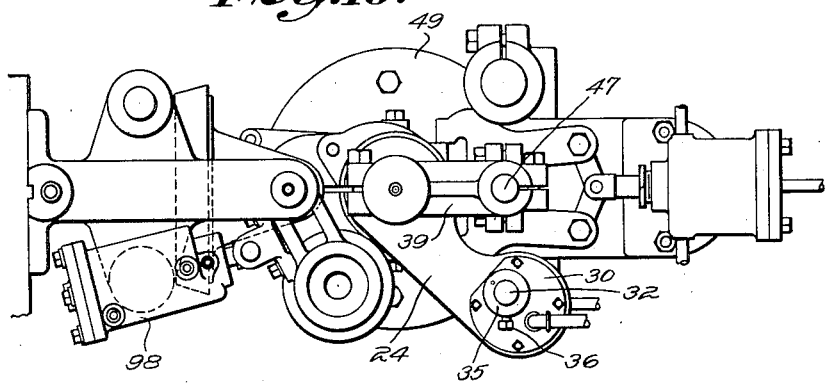
Witness
Benj. X. Bartman
Inventor
Arthur Edgar Smith
by Brown & Carham
Attorneys

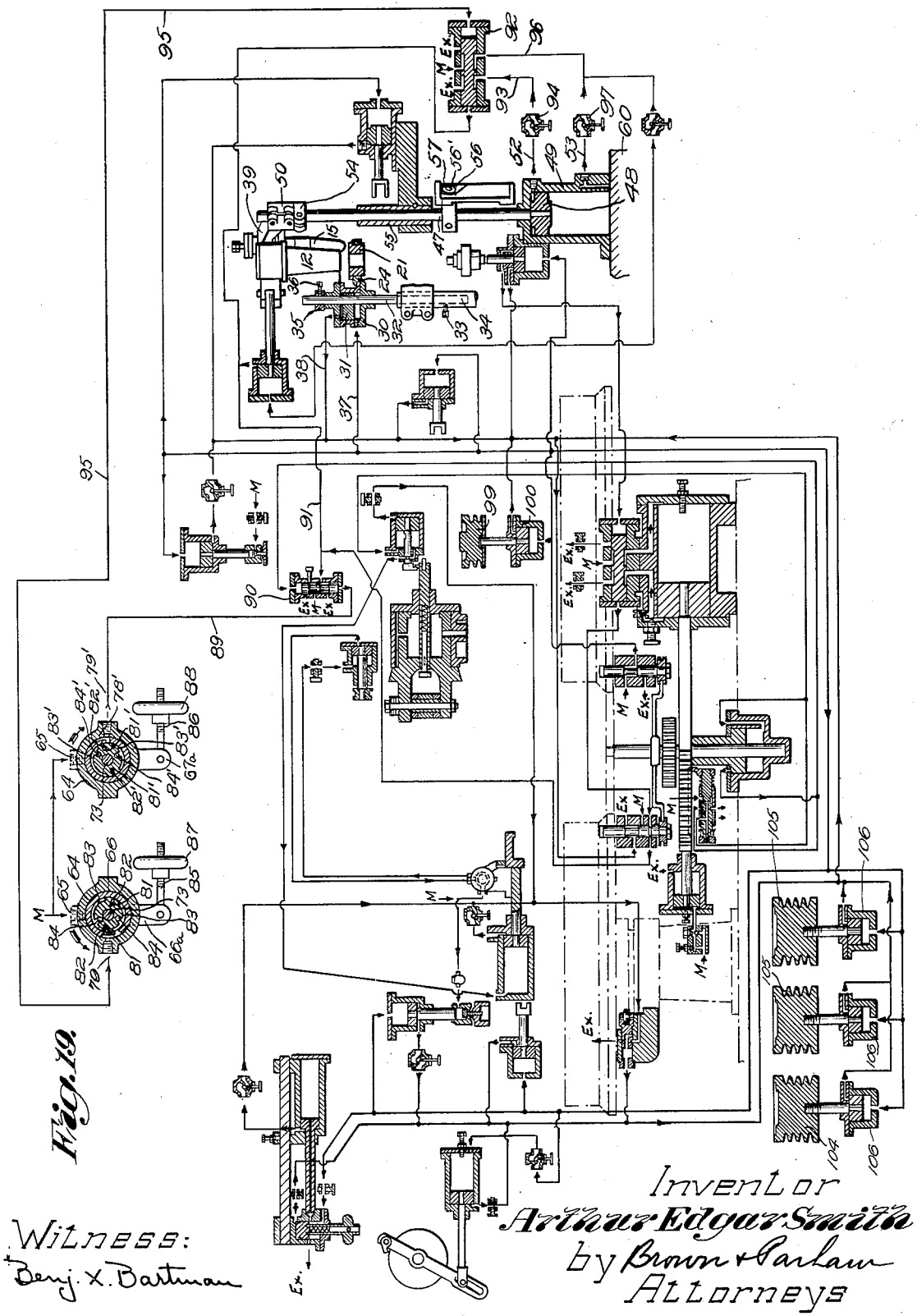

Patented Feb. 6, 1934

1,945,985

UNITED STATES PATENT OFFICE 1,945,985

MANUFACTURE OF BOTTLES AND OTHER ARTICLES IN GLASS AND APPARATUS THEREFOR

Arthur Edgar Smith, Kensington, near Sydney, New South Wales, Australia, assignor to Hartford-Empire Company, Hartford, Conn., a corporation of Delaware Application September 29, 1932, Serial No. 635,360, and in Australia December 1, 1929

10 Claims. (Cl. 49—9)

This application is in part a continuation of my prior application, Ser. No. 499,340, filed December 1, 1930 for "Improvements in manufacture of bottles and other articles in glass and apparatus therefor", and is filed to disclose and claim not only the novel subject matters of invention of the disclosure of the aforesaid prior application, but also additional matters, particularly certain improvements in adjustable and regulably timed and controlled operating mechanism of a practical and efficient machine for carrying out the methods of my aforesaid prior application.

The following quotations are excerpts from my aforesaid prior application Ser. No. 499,340:

"This invention relates to the manufacture of bottles, tumblers and like articles in glass. It has been devised for operation in the type of bottle making machine commonly known in the glass trade as 'gob' or 'feeder fed'; it is, however, usable with machines operating on what is known as the 'flow method', whereby charges of molten glass metal are supplied to the blank molds from a continuous stream of glass metal as the molds pass the feeding station successively. All these feed arrangements are known in the present practice of the art, and the herein described process and apparatus can be adapted to any of them by a competent workman.

"In the usual gob feeding method, charges of molten glass metal are extruded through an orifice sized appropriately to the weight of glass required in the charges, and the gob which is snipped from the pendant stream of glass falls direct or through funnels or troughs into the blank mold whilst movement of the mold is arrested momentarily below the feeder. The blank molds are usually vertically split molds which are supported by hinge brackets on a rotating table. Solid blank molds may be used for such articles as tumblers; in this case a different method of transferring the parison is used, as it must be lifted out of the mold before it can be transferred to another mold. In the case of split blank molds the neck portion of the blank mold embraces a neck ring mold. The parison is suspended in the neck ring mold after the blank mold opens, until the parison is seized by a blowing mold which is carried on another rotating table, the paths of the blank molds and the blowing molds being coincident at the transfer position. The ring molds associated with the blank molds are opened automatically in the transfer operation. The blank mold table and the blowing mold table are each fitted with a group of molds which come into operation successively as the tables make their rotational movements, halting momentarily at each stage. The operations of one mold only on each table are referred to below; it will be understood that all the molds in the assembly operate similarly.

"When the blank mold is at the feed station it is in an inverted position, that is, its neck end is at the bottom; its neck is closed by a coring plug which protrudes into it and produces a cavity in the glass metal which fills the neck part of the mold; this cavity forms the entry for the introduction of blow air to the interior of the parison.

"The glass metal falls into the neck and shoulder portion of the mold, but the bottom part of the mold (which for the time being is inverted) is vacant. Immediately the gob has fallen into the blank mold a blow head is brought down on the mold and air pressure admitted through it to settle the glass in the mold neck, or otherwise suction is applied through the neck coring plug to pull the molten glass down and settle it in the mold neck and in the neck ring.

"The blank mold containing the parison is reversed after it leaves the charging station and before it reaches the transfer station. When it is reversed the pasty glass in it tends to sag towards the bottom of it by gravity, but this glass does not distribute evenly and form a wall and bottom of uniform thickness when it is blown and distended by air pressure. Glass tends to hang to the blank mold walls where the initial cooling happens, that is about the level of the top surface of the gob, with the result that the bottle ultimately obtained has walls which are too thick or wavy in this middle zone; a vertical section through the bottle shows relatively thick and wavy in a zone about or below the mid-height of the bottle.

"When the charged blank mold arrives at the second station a baffle plate comes against the open bottom of it and a blowing head comes against the top of the ring mold, and air is blown into the glass in the mold through the neck core. Usually this blow is delivered downward after the charged mold has been reversed, but it is quite practicable to deliver it upward through the mold neck before the mold is reversed, that is to say whilst the mold is still in the inverted position in which it was when the gob was fed into it. This air blow inflates the glass, causing it to form a parison having the full shape of the blank mold. The blowing head and baffle plate being then retired, the mold moves to the transfer station. There the blank mold opens, leaving the parison suspended by the neck in the ring mold, the blow mold closes round the parison, and then the ring mold is released. The blow mold carrying the parison then moves to a blowing station where a blowing head comes down on the neck of it (the parison being now erect) and air is forced in to distend the parison, the mold bottom being closed at this stage. The bottle thus formed in the blow mold is at a later stage transferred from the machine to the lehr. The above description covers the usual operation in machines in common use; there are other machines in use which involve operations differing more or less from those described, though in effect they are substantially the same.

"Bottles produced on these machines display certain irregularities in section and are unsightly by reason of lumpiness and waviness due to the uneven thickness of the glass in their side walls and bottom; this irregularity or flaw in section is a cause of weakness in the bottles; the lustre of the glass also suffers by reason of striation marks, and the glass is not distributed to the best advantage.

"In order that the glass may be blown to substantially uniform thickness in the parison walls it is essential that the glass mass in the blank mold be as nearly as possible at an even temperature and viscosity; hotter portions of the blank will blow more readily than cooler parts of it. The outside of the gob of glass is chilled in passing into the blank mold. It is also locally chilled by contact with the shears, and it is more or less chilled over its exposed surface. It suffers further chilling where it makes contact with the surface of the blank mold which is at a somewhat lower temperature than the glass. The top side of the lump in the mold is further chilled when air pressure is brought in to settle it in the mold neck. The glass in the inside of the gob in the blank mold is considerably hotter than the glass on the outside of it. The cooler portion of the gob tends to 'hang' by reason of its high viscosity and when the blow is applied it does not flow quite as readily as the relatively hotter glass which comes from the center of the gob. When the parison is blown, the glass does not distribute quite evenly on the mold walls, and a thick or wavy zone is formed about mid-high of the bottle, and immediately below it a relatively thinner section; also, centrifugal action caused by the table rotation tends to move the more fluid glass to the outer side of the mold, with the result that one side of the bottle and the bottom adjacent that side becomes thicker than the corresponding parts at the side of the bottle which is nearer the center of the table.

"In what is known as the suction feed type of bottle machine this defect does not occur for the reason that the blank mold is caused to be fully charged by creating a vacuum in it to suck glass up into it.

"In the gob feeding method in which air pressure is used to force the glass down in the blank mold and compact it into the neck ring, air leak occurs at the joint of the blow head with the mold base and it is sometimes desirable to use a hotter glass than would be otherwise necessary in order to ensure that the diminished air pressure will suffice to force the glass down sufficiently to form a sound neck. High temperature of the glass at this stage militates against high speed operation in the later stages of manufacture for several reasons. The glass mass in the blank mold is unnecessarily mobile and runs too freely when the parison is hanging in the finish mold. A surplusage of glass therefore comes to the bottom of the mold, a heavy bottom results, and it is difficult to keep the bottle in perfect shape after it is taken out of the mold. The use of very hot glass also causes overheating of the molds, necessitating the use of much cooling wind. A remedy is found in limiting the speed at which the machine is operated.

"According to the present invention the glass in the blank mold is compacted downwardly and a portion of it is displaced upwardly by forcing a plunger down into the mold whilst it is in reversed position (bottom end up) after the gob enters it. This plunger displacement is best effected at the charging station immediately the gob has entered the mold, but it might be effected at the next station reached by the mold after it leaves the charging station. A middle cavity is thus produced in the glass mass and an annular wall of glass is formed up round the plunger and spread over the whole or nearly the whole wall surface of the blank mold. The thickness of this glass wall is determined by the clearance between the plunger and the mold sides. One effect of this plunger being introduced into the center of the molten glass in the mold is to slightly chill the surfaces of the core hole which it forms in the glass blank.

"Displacement of glass metal in a blank mold by a plunger introduced through the mold neck is known in the art, but for a different purpose. A displacement plunger is used for instance in molding screw neck jars to force glass up from the body of an erect mold into a ring or neck mold at the top of it. In the system of the present invention a displacement plunger is introduced downwardly through the bottom of an inverted blank mold to displace glass from the mass in the neck end of the mold, to produce an open bottom parison, and the parison bottom is produced in a subsequent blowing operation.

"The plunger used in the practice of the present invention functions as a compacter and displacer, but it may also be used in introduce air into the parison blank. Air introduced after the glass has been displaced by the plunger has not the detrimental effects of air blown into the mold whilst the glass is in a mass in the lower part of it; the glass is displaced by the plunger before the air is introduced and the sides of the mold are thus fully covered before the glass is chilled by the air. The plunger is maintained at a suitable temperature so as on the one hand not to cause over-cooling of the glass with which it contacts, and on the other hand to keep it below the temperature at which glass is liable to adhere to it. This temperature is controlled by circulating air through an axial pocket in the plunger; without internal cooling, and in most cases also in the absence of external cooling by air blown upon it, the plunger is liable to become too hot.

"When in the stage of operation following plunger displacement of the glass air is blown in through the neck cavity of the parison blank, this air operates against the still viscous wall of glass which lines the blank mold, and distends it and causes it to form up closely on the mold wall and to flow down and form a bottom on the parison. As the glass parison so produced is uniform in thickness and temperature or nearly so, tendency to form a thick or wavy zone at an intermediate position in the bottles' length is not displayed, and bottles are produced which have a substantially regular section from shoulder to bottom.

Bottles, jars, tumblers and the like thus produced have a better appearance than those produced according to the existing method, and the rate of production is augmented.

"Whilst the invention is primarily concerned with the manufacture of bottles in automatic feeder type air blowing machines it is to be understood that it extends also to the manufacture of bottles and other articles in certain types of hand fed machines operating under either pressure or vacuum.

"Cooler glass can be supplied to the blank mold when plunger displacement is resorted to than when air pressure or vacuum settling is relied on. The cooler glass is less liable to surge and run. Also the plunger has itself a cooling effect on the core walls in the glass mass which it displaces up into the annular clearance between it and the wall of the blank mold. This core cooling effect restrains tendency of the glass to move by gravity or by centrifugal action.

"At present there is always a tendency for the glass to thicked up in cross section at the zone in which the top of the fed-in charge lies in the blank mold, owing to incipient stiffening of the glass at that place, due to the cooling effect of the air on the top of the charge. The plunger displacement method eliminates this tendency. As the temperature of the glass is relatively low at the blowing stage, tendency of the glass to blow into the joint between the baffle plate and the bottom of the blank mold is restrained; the bottom seam is thus reduced in prominence and a neater finish is obtained.

"Because the glass is cooler and does not run so freely as in the known process, better setting of the glass takes place during the stages preceding the take-off; this conduces to improved appearance and better lustre.

"In the existing practice movement of the glass downwardly in the blank mold is irregular and to some extent uncertain as it depends solely upon air pressure causing flow of a material the viscosity of which is undergoing progressive change and varies to some extent with differences in temperature caused by accidental circumstances. In the method of the present invention a positive distribution of glass in the blank mold in the precise way required to produce an even parison is assured by plunger displacement, and the parison blow is not alone depended on to distribute glass along the sides and in the bottom part of the mold. Better centering is thus obtained and consequently better assurance that all sides of the bottle will finish to substantial uniformity in section both longitudinally and transversely.

"In the usual practice there is a joint between the end of the blank mold and its bottom plate; this joint is located at the side of the section, and when the glass is sent down in the parison blow a fin is formed at this joint and this fin shows around the bottom chime of the finished bottle and is a blemish. The formation of a fin at this place and the consequent blemish of the bottle is avoided in my method as there is no bottom joint at the outer face of the blank mold. The parison bottom is formed by inflow of glass from the walls over the bottom plate, with the seam between the mold lip and the bottom plate well within cover of the chime portion of the mold."

The settling down of the glass charge in the blank mould neck may be effected by the known arrangement in which vacuum is applied through the neck pin cap to suck down the glass.

In the accompanying drawings:

Figure 1 is a vertical section through a blank mold and certain associate parts at a station for receiving a charge of glass, the blank mold being in inverted position;

Fig. 2 is a vertical section through the blank mold at the charge receiving station after a charge has been delivered thereto and the glass of the charge in the mold cavity has been distributed by the downward projection thereinto of a plunger embodying certain features of the present invention and adapted for use in carrying out the method of this invention;

Fig. 3 is a vertical section through the blank mold at a station subsequent to the charge receiving station, showing the mold in reverted or upright position with a bottom plate applied to the lower end of the upright mold and a blow head applied to the top of the neck ring portion of the mold, air pressure having been applied to produce a hollow parison;

Fig. 4 is a vertical section through a blow mold to which the hollow glass parison of Fig. 3 has been transferred, the view showing the parison hanging by its neck in the blow mold;

Fig. 5 is a vertical section of the blow mold with the parison therein after a reheating period and at a station subsequent to the transfer station of Fig. 3, the view showing a bottom plate applied to the lower end of the blow mold and having a central portion by which the bottom of the pendant parison may be pushed upward and/or supported in centered position in the mold cavity. (This view shows a condition which may be repeated at one or more stations after the transfer station);

Fig. 6 is a vertical section through the blow mold with a blow head applied to the upper end thereof, a bottom plate applied to the lower end thereof, the view showing the glass of the parison after it has been distended by blowing pressure to full shape in the blow mold. (This view may be the same at one or more stations to which the blow mold will be moved by the rotary movements of the blow mold table);

Fig. 7 is a vertical sectional view through a blow mold having a relatively short glass parison therein, the view showing a modified form of bottom plate or heel cap for pushing the bottom of the parison upward at one or more stations after the glass of such parison has sagged and stretched in length during its movement to each of such stations;

Fig. 8 is a vertical sectional view of a modified form of plunger adapted for use in carrying out the invention;

Fig. 9 is a fragmentary sectional view substantially along the line 9—9 of Fig. 2;

Fig. 10 is a fragmentary sectional view substantially along the line 10—10 of Fig. 2;

Fig. 11 is a diagrammatic plan of a two-table forming machine equipped with structure embodying the present invention and adapted for use in carrying out the method of such invention;

Fig. 12 is a longitudinal vertical section through a timing valve adapted for use in regulably controlling the operations of the plunger of the present invention;

Fig. 13 is a transverse section through the timing valve, substantially along the line 13—13 of Fig. 12;

Fig. 14 is a transverse section through the timing valve, substantially along the line 14—14 of Fig. 12;

Fig. 15 is a side elevation of the plunger of the present invention and its operating mechanism, the view showing also mechanism for guiding and centering the plunger in its downward movement to glass displacing position in an inverted parison or blank mold at the charge receiving station;

Fig. 16 is a plan view of the structure shown in Fig. 15;

Fig. 17 is a slightly enlarged elevation of mechanism for swinging the plunger laterally during the upper part of its vertical reciprocatory movements;

Fig. 18 is a section substantially along the line 18—18 of Fig. 17; and

Fig. 19 is a diagrammatic view showing air lines, valves, and pneumatic devices for actuating and controlling the plunger and associate moving parts of the present invention as applied to a glassware forming machine of the type known in the glass art as the Lynch "Narrow neck" machine.

It is usual in a forming machine of the type shown diagrammatically in Fig. 11, an example of which may be found in the Patent No. 1,766,135, granted June 24, 1930 to J. W. Lynch, for the blank molds to be carried on one table and the blow molds to be carried on an adjacent table. In Fig. 11, the blank mold table is indicated at A and the blow mold table is designated F. The blank mold table is shown as having six halting stations, of which the mold charging station is indicated at B, the blank or parison blowing station is indicated at C, E is the transfer station, and D, D' and D'' may be idle stations.

The blow mold table F may have six or more stations. In the particular arrangement shown diagrammatically in Fig. 11, the blow mold table carries six blow molds and would have six halting stations, including the transfer station E which is common to the two tables. The operation at these halting stations will be hereinafter pointed out.

The blank mold table A carries six blank or parison molds, each including a partible body portion 10 and a partible neck portion 11. Suitable supporting and operating mechanisms are provided for the blank or parison molds, whereby each parison mold may be inverted and reverted and the parts thereof may be opened and closed at the proper times and places in a cycle of rotation of the table A. Such mechanisms may be substantially as disclosed in the aforesaid Lynch patent.

Each blank mold is presented in its turn at the charging station B, the mold being in inverted position at that station, substantially as indicated in Figs. 1 and 2. The inversion of the blank mold may take place while it is being moved from station D'' to station B.

A funnel 12, Figs. 1 and 15, may be disposed over and in alignment with the cavity of the inverted parison mold at the charge receiving station and in position to direct downwardly toward the mold cavity a charge of glass from an automatic feeder (not shown) or from any other suitable source of supply of glass charges. When the blank mold is at its charge receiving station, as shown in Figs. 1 and 2, the lower end of the neck portion thereof may be closed by a suitable head, such as indicated at 13, by which a neck pin or initial blow aperture forming member 14 is supported in the neck portion of the parison mold. The neck pin may be raised and lowered at the proper times by any suitable known mechanism.

Mechanism embodying structural aspects of the present invention and adapted for use in carrying out the method of the invention will now be described. Such mechanism includes a plunger, such as indicated at 15 in Figs. 2, 15 and 19. The plunger 15 has a tapered lower end portion 15a adapted to be projected downward through the open upper end of the inverted parison mold into the glass charge 16 in the mold cavity. This downward movement of the plunger 15 will tend to compact some of such glass about the neck pin 14 in the neck portion of the blank mold, and will displace other glass of the charge upwardly, as indicated at 17, Fig. 2. The extent of upward displacement of the glass at 17 is regulated so that the upwardly displaced glass will fill the annular space between the tapering portion 15a of the plunger and the side walls of the mold cavity almost, but preferably not quite, to the upper end of such annular space. As shown, the taper of the portion 15a of the plunger corresponds approximately with the splay of the upper end of the cavity of the inverted parison mold.

The reason for halting the upward displacement of glass before such glass is forced to the extreme upper end of the annular space between the glass displacing plunger and the side walls of the mold cavity is to obviate seams which might otherwise be produced if glass were chilled by contact with substantially right angular walls at the extreme upper end of the space between the plunger and the walls of the mold cavity.

The portion of the plunger 15 immediately above the tapered portion 15a may be cylindrical, as shown, and is adapted to fit closely, although slidably, in the entrance to or mouth of the cavity of the inverted parison mold. The joint between the plunger and the mold preferably is within the area of the bottom of the mold, so that any seam mark which subsequently may be formed will be located under the bottom of the finished bottle and will not show on the side of the bottle or on the chime of the bottle bottom. The cross-sectional area, length, and shape of the plunger should all be designed with relation to the dimensions and shape of the parison mold with which the plunger is to be used and of the bottle or other glass article to be produced.

The plunger 15 preferably is hollow. The bore or axial cavity thereof may be closed at its lower end, as in the form shown in Fig. 2. A tube 18 depends into the axial bore or cavity of the plunger and may be employed to discharge cold air into the lower end of the plunger at a regulably controlled rate. The air or other suitable cooling fluid employed will cool the plunger and may escape from the interior of the plunger through suitable vents or openings in the plunger supporting mechanism, as through the vents indicated at 19 in the plug at the top of the coupling member 20 of Fig. 2.

In Fig. 8, a modified form of plunger 115 has a bore extending the full length thereof. A valve 116 is adapted to close the lower end of the bore of the plunger 115 and is rounded so as to form the tip of the plunger itself when the valve 116 has been raised to its closed position against the adjacent end of the plunger. The valve 116 is carried by a stem 117 which extends through the plunger bore and is provided at its upper end with an adjustable head, shown as a nut 118, for cooperating with lugs 119 on the inner wall of the adjacent portion of the plunger to limit the downward movement of the valve 116. Non-circular enlarged portions 120 and 121, respectively, of the valve stem 117 cooperate with the wall of the bore of the plunger 115 to maintain the valve 116 in axial alignment with the plunger. Air under pressure may be applied through the bore of the plunger 115, such air passing around the head 118 and between the lugs 119 and then downwardly along the valve stem to the lower end of the plunger bore. When the valve 116 strikes the glass as the plunger is moved downward, the valve will be closed by the pressure of the glass acting against it, and the air will be confined within the plunger bore. However, when the plunger has reached its full downward stroke, the valve 116 will be forced open by the air pressure acting behind it. Air then will escape through the space between the valve and the adjacent end of the plunger, and will pass up along the surface of the plunger and find escape at the top thereof. This air chills the skin of the cavity in the glass and facilitates the withdrawal of the plunger by diminishing the tendency of the glass to stick to it. The operation of the valve 116 is entirely automatic. As the plunger is withdrawn, the air applied through the plunger 115 will be continued until the plunger has reached its upwardly retracted position, when such air pressure preferably will be cut off. The control of the air pressure to the plunger may be effected by any suitable known means.

The plunger 15 preferably is guided as it moves downward to the position shown in Fig. 2 by a guiding and centering ring 21. The bore of this ring 21 may flare at its upper end so that the ring also is adapted to serve as a lower charge guiding funnel when the plunger has been withdrawn and has been displaced laterally in a manner to be presently described. The ring 21 is supported adjustably by an eccentric adjusting ring 22, which is journaled in a circular opening 23 in a supporting arm 24, Figs. 1, 2 and 10. The adjusting ring 22 may have a flange 25 at its upper end overlying a portion of the supporting member 24. The guiding and centering ring 21 may be supported in the adjusting ring 22 by a flange 26 at the upper end of the ring 21. The lower end portion of the guiding and centering ring 21 depends below the lower end of the adjusting ring 22, and is provided with external screw threads, whereby it is adapted for engagement with a jam nut 27. The arrangement is such that when the nut 27 has been loosened, the ring 22 may be turned about its axis, so as to adjust the axis of the guiding and centering ring 21 horizontally. The ring 21 may then have a slight horizontal float adjustment in the ring 22. When the jam nut 27 has been tightened, the adjusting ring will be clamped to the member 24 and thus held firmly, although releasably, in adjusted position, and the ring 21 also will be maintained in adjusted position. The horizontal adjustment of the member 21 in the manner just described is intended to provide a means for aligning the member 21 axially with the bore of the inverted parison mold. As a further means for effecting this desirable alignment, it may be noted that the member 21 is undercut, as indicated at 28, so as to have a close seating fit with the bevelled or tapered central projection 29 at the top of the inverted parison mold.

The arm 24 is raised and lowered so as to move the ring 21 vertically to and from its seated position at the upper end of the inverted parison mold. Mechanism for raising and lowering the arm 24 may comprise a cylinder 30, Figs. 15, 16 and 19, by which the member 24 is carried. The cylinder is movable vertically with respect to a stationary piston 31, Fig. 19. The piston 31 is carried by a normally stationary but vertically adjustable vertical shaft 32, Figs. 15, 16 and 19. The shaft 32 is eccentric with both the cylinder 30 and the piston 31, and is held against turning angularly about its axis and in vertically adjusted position in any suitable manner, as by a screw 33, Figs. 15 and 19, extending through the walls of the tubular upper portion of a standard 34, in which the lower end portion of the shaft 32 is received, and engaging such shaft. An adjustable stop 35, which may be a collar secured releasably to the shaft 32 by a set screw 36, as best seen in Fig. 19, will limit the extent of upward movement of the cylinder 30 with respect to the piston 31. The extent of downward movement of such cylinder may be limited by the seating of the ring 21 on the upwardly projecting central portion of the inverted parison mold, which in turn may be insured by appropriate vertical adjustment of the shaft 32.

When air under pressure is admitted to the lower end of the cylinder 30, as through the air line 37, Fig. 19, the cylinder will be moved downward, carrying with it the arm 24 and the parts carried by such arm, including the guiding and centering ring 21. The latter will thus be moved to the position shown in Figs. 1, 2, 15 and 19. As the ring 21 moves downward, the engagement of the portion 28 thereof with the upwardly tapered central portion 29 of the inverted parison mold will bias the latter into exact alignment with the ring 21 should the action of the mold inverting mechanism have been slightly inaccurate.

On application of air pressure to the upper end of the cylinder 30, as through the air line 38, the cylinder will be raised, lifting the arm 24 and the ring 21 above the upper end of the inverted parison mold and permitting the latter to swing out from beneath the ring 21 as the blank mold table is rotated.

The adjustable supporting and operating mechanism for the plunger 15 may comprise a supporting arm 39 having a split clamp 40 at the extremity thereof, as best seen in Fig. 9. This split clamp portion of the arm 39 has internal screw threads engaged with screw threads on an eccentric adjusting bushing 41. The tubular member 20 depends through the adjusting bushing 41 and has its lower end portion reduced and threaded externally for engagement at 42, Fig. 2, with the internally threaded enlarged upper end portion 15b of the plunger. The halves of the split clamp 40 may be connected by a lock bolt 43. A removable flange 44 is secured on the lower end portion of the coupling member 20, as by a pin or set screw 45. The upper end of the plunger 15, which preferably is flanged as shown at 46, provides a seat for the flanged lower end of the member 41 when the plunger is forced downwardly into the glass, as shown in Fig. 2.

The arrangement is such that turning of the member 41, which may be effected when the lock bolt 43 has been loosened, will adjust the plunger 15 horizontally within limits for the purpose of aligning the plunger axially with the guide ring 21. The lock bolt 43 then may be tightened to secure the eccentric adjusting member 41 in its adjusted position. Sufficient clearance is provided between the members 20 and 41 so that the plunger may have a slight floating adjustment as the plunger moves downward through the guiding and centering ring 21. Approximate alignment of the plunger with the guiding and centering ring 21 has been obtained by adjustment of the eccentric member 41.

The arm 39 is carried by a vertically movable rod 47 which may constitute an extension or prolongation of the stem of a piston 48 in a vertical cylinder 49, Figs. 15 and 19. The connection between the arm 39 and the rod 47 may be effected by the provision of a split clamp 50 at the outer end of the arm 39, together with clamping bolts 51 connecting the parts of the split clamp and securing the latter in vertically adjusted position on the rod 47.

The upper and lower ends of the cylinder 49 are provided with ports to which the air lines 52 and 53, respectively, are connected, as best seen in Fig. 19. A split collar 54 is secured to the rod 47 in vertically adjusted position therealong for engagement with the upper end of a fixed stop member 55 when the plunger is at the lower end of its stroke. The lower limit of such plunger stroke, and therefore the distance to which the lower end of the plunger will be projected downwardly into the glass in the underlying mold thus may be varied. The extent of upward displacement of glass in the parison mold as the plunger moves downward may thus be regulably controlled.

The plunger is swung horizontally as it is moved vertically, so that it will be swung laterally from an out-of-the-way position into axial alignment with the mold at the charge receiving station during part of its down stroke. The plunger then will be moved vertically downward into the mold to effect displacement of glass in the manner described. Part of the upstroke of the plunger will be vertical. The plunger then will be swung laterally to its out-of-the-way position during the remainder of such up-stroke. Mechanism suitable for effecting this horizontal movement of the plunger 16 as it is moved vertically may comprise a roller 56 on a laterally extending stud 56' carried by the rod 47 in position to work in a suitably curved cam groove 57 in a fixed cam plate 58 as the rod 47 moves vertically. The cam plate 58 may be secured by cap bolts 59 or other suitable fastening devices to fixed standards on the supporting block 60, as best seen in Figs. 17 and 18. One of these standards may be the member 34, hereinbefore referred to as supporting the stationary piston rod 32. The other standard is designated 34a in Figs. 17 and 18.

The block 60 may include the cylinder 49, hereinbefore referred to, and be provided with split vertical side portions, such as indicated at 61, for releasably holding the aforesaid standards. Pins, such as indicated at 62 in Fig. 17, may be employed to prevent play between the plate 58 and the supporting standards 34 and 34a.

The times of beginning of the upward and downward movements of the plunger 15 may be independently adjusted by independently adjusting the times of application of air pressure to the opposite ends of the cylinder 49. To this end, a timing valve, generally indicated at 63 and best seen in Figs. 12 to 14 inclusive, may be employed, together with suitable air conducting connections between such timing valve and the opposite ends of the cylinder 49.

The timing valve 63 comprises a shell or casing 64 of generally cylindrical form, and provided intermediate its ends with an air inlet port 65. Within the shell 64 and adjustable angularly independently of each other are aligned bushings 66 and 67, respectively. The inner ends of these bushings are spaced apart at the inner end of the port 65 so as to provide an air intake chamber 68. This chamber 68 also extends between spaced aligned rotary valve cores 69 and 70, which, respectively, are journalled in the bushings 66 and 67.

The valve core 69 has a head 69a fitting closely but slidably against the flanged adjacent end of the bushing 66. A clamp, comprising a block portion 71 integral with the head 69a and a separate or cap portion 71' secured to the portion 71 by cap screws 72, fastens the rotary valve core 69 to a shaft 73. A clamping washer 74 and a nut 75 on the shaft 73 clamp the valve core 70 against a flange 76 on the portion of the shaft 73 that is disposed within the valve casing. The arrangement is such as to maintain the flanged outer end or head 77 of the rotary valve core 70 in close fitting but sliding contact with the flanged adjacent end of the bushing 67.

The bushing 66 is provided in its outer periphery with an arcuate groove 78 having communication with the inner end of a port 79 in the shell 64. The arcuate groove 78 has communication at one end thereof with a radial passage 80 in the bushing 66. The valve core 69 has a pair of diametrically opposite longitudinal passages 81 communicating at their inner ends with the chamber 68. The passages 81 terminate short of the outer end of the valve plug 69 and at their outer ends are provided with out-turned radial passages 82. These passages 82 lie in the vertical plane of the passage 80 through the bushing 66, so that communication between the chamber 68 and the port 79 will be established twice during each complete revolution of the valve core 69. Arcuate exhaust grooves 83 in the periphery of the valve plug 69 communicate with the atmosphere at one end of the valve structure through longitudinally extending passages 84.

The bushing 67 and the valve plug 70 of the second half of the timer valve are formed to provide similar means of communication between the chamber 68 and a port 79' in the portion of the shell 64 that surrounds the bushing 67 and between the port 79' and the atmosphere. The bushing 67 and the valve plug 70 thus have passages corresponding with the passages 78 and 80 to 84 inclusive. Such passages are designated 78', 80', 81', 82', 83' and 84', whereby their character and functions will be sufficiently indicated by reason of the description hereinbefore given of the air conducting passages for the portion of the valve in which the valve core 69 is disposed. It may be noted at this point, however, that the valve cores 69 and 70 may be spaced angularly about the axis of the shaft 73 so as to provide appropriate angular spacing of corresponding passages in the respective valve cores.

The bushings 66 and 67 respectively are provided with extending arms 66a and 67a, to which adjusting rods 85 and 86, respectively, are attached. Adjusting wheels 87 and 88 threadedly engage the rods 85 and 86 and may be held against axial movement in any suitable known manner so that the rods 85 and 86 will be moved axially when these wheels are turned. This will adjust the bushings 66 and 67 angularly about the axis of the shaft 73. The adjustment of each of these bushings is independent of adjustment of the other bushing so that the times in a cycle of rotation of the shaft at which air will pass from the chamber 68 to the port 79 may be varied independently of the times in the cycle of rotation of the shaft 73 at which air from the chamber 68 will pass to the port 79', and vice versa.

The port 79' is connected by an air line 89 with a control valve 90. An air line 91 connects the valve 90 with a secondary control valve 92. An air line 93 connects the valve 92 with a valve 94. The valve 94 is connected by the air line 52, hereinbefore referred to, with the upper end of the cylinder 49. The port 79 is connected by an air line 95 through the valve 92 with an air line 96. The air line 96 is connected with a valve 97, which in turn is connected by the air line 53 with the lower end of the cylinder 49. The valves 94 and 97 are adjustable check valves which will allow a full volume flow of pressure fluid directly therethrough to the cylinder, but will permit an adjustable return flow or exhaust of air from the cylinder. By independently adjusting the valves 94 and 97, the rate of exhaust of air pressure from the opposite ends of the cylinder may be predetermined and controlled. The speeds of upward and downward movements of the plunger 15 thus may be regulably controlled.

Once the speed of the down-stroke of the plunger has been determined and the valve 97 has been set to produce the speed desired, the length of the dwell of the plunger at the lower end of its stroke can be lengthened or shortened within limits by adjustment of the bushing 66 of the timing valve angularly about the axis of the shaft. In Fig. 19, the two axially aligned parts of the unitary timing valve 63 are shown out of their true relative positions for the sake of clearness, but it will be understood that these parts are in axial alignment with each other.

The air lines hereinbefore referred to as involved in the operation of the plunger are shown in Fig. 19 in combination with certain air lines, controlling valves, safety devices, etc., substantially as would be provided in the application of the improvements of the present invention to a forming machine of the Lynch type of construction. Thus, the actuation of the control valve 90 by air from the line 89 will initiate a series of operations of the pneumatically operated parts of and members associated with the forming machine, including, at the proper time, an actuation of the valve 90 to return it to the position shown in Fig. 19. The valve 90 when actuated by air from line 89, will supply air through the line 91 to the valve 92. The consequent actuation of the latter will effect application of air through the line 93, valve 94 and line 52 to the upper end of the cylinder 49 and permit exhaust of air from the lower end of the cylinder 49 through the line 53, valve 97, and line 96.

The arrangement of air lines and valves includes means for controlling the flow of air through the lines 37 and 38 to the opposite ends of the cylinder 30 for moving the plunger centering and guiding ring 21 vertically and for effecting movements of other moving parts of the forming machine, some of which will be hereinafter referred to. Detailed description of the connections and operations of the respective valves and air lines need not be included herein as they are well known in the art. The general arrangement is substantially as shown in the Lynch Patent 1,766,135, hereinbefore referred to.

The operation of a practical embodiment of the invention as applied to a two-table forming machine of the type shown in Fig. 11 is substantially as follows:

When a parison mold on the blank mold table A is brought in inverted position to the station B, the ring 21 will be lowered so that the undercut portion 28 thereof will engage with and center the inverted mold with respect to the ring, thereby correcting any inaccuracy in the indexing of the blank mold by the mechanism whereby it was inverted. The funnel 12 will be swung from its out-of-the-way position to a position over and in alignment with the ring 21 and the blank mold, substantially as shown in Fig. 1. This movement of the funnel 12 to and from its charge guiding position in alignment with the blank mold at the station B may be effected by pneumatic mechanism, including the cylinder 98, Figs. 11, 15 and 19, which pneumatic mechanism may be substantially as disclosed in the aforesaid Lynch Patent 1,766,135, for oscillating the settle blowhead cylinder.

A charge of glass then is delivered to the blank mold through the funnel 12 and the ring 21. The funnel 12 then is returned to its laterally swung out-of-the-way position and air is admitted to the upper end of the cylinder 49 (Fig. 19) to give the plunger a movement having a lateral component until it is directly above and in alignment with the ring 21, and then a downward movement until the lower end of the plunger has displaced glass in the upper portion of the cavity of the blank mold, substantially as shown in Fig. 2 and as hereinbefore has been described. The depth to which the plunger will be thrust downwardly into the glass has been predetermined and adjusted so as to regulably control the height to which the glass annulus 17 will be formed with respect to the top of the cavity.

At a predetermined time after the plunger has been thrust downwardly into the glass, air will be exhausted from the upper part of the cylinder 49 and air admitted to the lower end of such cylinder to raise such plunger upwardly through the ring 21 and then to give it a movement that has a lateral component as well as a vertical component, so as to swing the plunger laterally out of alignment with the ring 21. The duration of the down-dwell of the plunger may be regulated in the manner described. By suitable regulation thereof, undue chilling of the glass will be obviated.

It will of course be understood that the shaft 73, carrying the cores 69 and 70 of the timing valve 63, may be driven from any suitable source of power, as by connection with a rotating part of the associate feeder, so that the timing valve will be operated to cause periodic actuations of the pneumatic mechanism for lowering the plunger 15 into the glass charges in successive molds at the charge receiving station and for retracting the plunger during periods of dwell of the associate forming machine. It already has been pointed out that the timing valve may be adjusted to vary independently the instants of lowering of the plunger and of the retraction thereof. The speed of rotation of the timing valve shaft will of course be predetermined in view of the particular construction of the timing valve and particular service conditions at a given time. Thus, it is obvious that the valve cores may each be provided with only one set of air intake and exhaust passages instead of duplicate diametrically opposite sets of such passages (81—82 and 83—84 in core 69 and 81'—82' and 83'—84' in core 69') as provided in the particular timing valve shown in the drawings, in which event the speed of rotation of the timing valve shaft would be twice that of the shaft shown in the drawings, assuming that other conditions were unchanged.

The plunger 15 may be cooled both internally by air circulated through the interior thereof and externally, when in raised position, by air blown thereagainst. Preferably, a slight quantity of oil will be blown on the surface of the plunger before it is thrust downwardly into the glass.

The mold carrying the glass having the cavity formed therein by the action of the plunger may be reverted by the time it reaches station C. A bottom plate 99, Figs. 3 and 19, may be brought upwardly to position to cover the lower end of the closed upright parison mold at station C. The bottom plate 99 may be moved vertically by pneumatic mechanism such as indicated at 100 in Fig. 19. A blow head 101, Fig. 3, may be lowered to position to cover the upper end of the neck ring of the parison mold at station C. Blowing pressure may be applied at station C through the initial blow aperture which was produced by the withdrawal at station B of the neck pin shown in Fig. 1. The introduction of the blowing pressure into the neck portion of the parison will cause displacement of an internal portion of the glass in the closed parison mold, so as to produce a hollow parison having substantially uniform and relatively thick side and bottom walls, substantially as shown at 102 in Fig. 3. The blow head and the parison bottom plate then will be retired.

It is important in this process that the pressing plunger be pushed into the glass as soon as possible after the glass is in the mold. This makes it highly desirable to save the time which would ordinarily be required to remove the charge guiding funnel. The charge guiding funnel 21 therefore may be left on the mold and the pressing plunger shoved down through the funnel into the glass. After the pressing operation, the funnel 21 and the plunger are both removed—first the plunger and then the funnel. After this, the baffle plate 99 is applied to the bottom end of the mold and the counterblowing operation takes place.

The body of the parison mold may be opened by the time the mold reaches the transfer station E (Fig. 11). The expansion of the parison by blowing pressure may be effected before the parison mold has been reverted, as suitable provision for such operation may be made by those skilled in the art.

It may be noted at this point that the parison mold may be designed so as to produce a parison having a belled skirt or lower end portion, substantially as shown in Fig. 3.

At station E the hollow parison will be suspended by its neck portion from the neck ring until the halves of a blow mold 103 on the blow mold table F have been closed to take over the support of the parison from neck ring. The halves of the neck ring then will be opened. As shown in Fig. 4, the parison 102 has been transferred to the blow mold and is suspended by its neck in the latter.

The blow mold is moved by the table F, and after passing the station E may move to a station G. At station G, the blank is still hanging in the blow mold. As the glass of the blank or parison is still quite plastic, such parison may stretch somewhat. The movement of the blow mold table also tends to swing the lower portion of it outward by centrifugal action during the movement of the blow mold from station E to station G. When the movement of the blow mold is halted at station G, the pendant parison will swing back to the vertical. A bottom plate 104 then may be raised to position to close the lower end of the mold. This bottom plate has a central portion 105 which may serve as a heel cap and thus not only support the bottom of the hollow parison 102 at the station G, but also push up the parison bottom more or less. The action of the heel cap may be predetermined and selected so as to control the amount of run of the glass and thus regulate the thickness of the parish bottom. The operation just described at station G may be repeated at the immediately succeeding station in a cycle of rotation of the blow mold table, or may take place at but one station after the transfer station, in which event the immediately succeeding station, indicated at H in Fig. 11, may be a blowing station.

At station H a full bottom plate 105 is raised in position to close the lower end of the blow mold, and a blow head 106 is lowered to operative position at the upper end of the mold. Blowing pressure is applied through the blow head to distend the parison so that the glass thereof will be expanded against the walls of the cavity of the mold. The blow head and bottom plate are retired and the mold will be moved to the succeeding station, which is indicated at J in Fig. 11. At station J, another bottom plate 105 may be raised to operative position and another blow head similar to the blow head 106 may be lowered to position above the mold and blowing pressure may again be applied to the interior of the hollow glass article.

The bottom plates 104 and 105 at the several stations may be raised and lowered by pneumatic devices such as indicated at 106 in Fig. 19. The halves of the parison mold are kept clamped tightly together at each blowing station, and at the glass charge receiving station by suitable clamping devices, such as indicated at 107 in Fig. 11. Similar clamping devices, indicated at 108, maintain the halves of the blow mold tightly closed at the blowing stations. These clamping devices may be of any suitable construction, such, for example, as disclosed in the aforesaid Lynch patent.

At station K, the blow mold may be opened and the finished article taken therefrom and placed on a conveyor 109 for delivery to a lehr. The halves of the blow mold may remain open for the remainder of the complete revolution of the blow mold table, the remaining station, indicated at M, being an idle station.

In Fig. 7, a modified form of heel cap or parison bottom supporting and push-up member is indicated at 104a. In lieu of the bottom plate 104, the member 104a may be employed at station G, and at the immediately succeeding station also, if required, to push the bottom of the suspended parison upwardly and to support the parison in centered position in the blow mold. In the operation illustrated in Fig. 7, the parison is shorter than that shown in Fig. 5, and the glass contacting portion of the member 104a is sufficiently small to be projected upwardly within the open lower end portion of the blow mold to support the bottom of the parison above the level of the lower end of the blow mold. The operation of this heel cap may be adjusted so as to push the bottom of the parison upwardly more or less. In this way, it is possible to control the amount of run of the glass and to regulate the thickness of the bottom of the article being formed.

The invention has been described as applied to a two-table forming machine, and as used in the manufacture of bottles. It is to be understood, however, that the invention is not restricted to application to a machine of the type shown or to the method described, but may be applied to forming machines of various types of construction and modes of operation and may be used in the manufacture of bottles, jars, tumblers, and other articles of hollow glassware.

What I claim as my invention and desire to secure by Letters Patent is:—

1. The method of producing a parison for a bottle or like glass article, which consists in introducing molten glass into an inverted blank mold, settling this glass in the neck of the mold and displacing a portion of the glass by thrusting a plunger downwardly into the glass in spaced relation with the walls of the mold cavity so as to cause a portion of the glass to rise in the annulus between the plunger and the mold walls, admitting air under positive pressure through the head of the plunger to the cavity thus formed, retiring the plunger and continuing the delivery of air through the head of it during the retiring movement, applying a bottom plate to the bottom end of the mold and a blow head to the opposite end of the mold, and blowing the parison through the blow head the blowing operation being commenced while the cavity in the glass in the bottom end of the mold persists.

2. In the manufacture of hollow glassware, the method which comprises forcing a plunger downwardly into the upper end of a charge of glass in an inverted parison mold to form a cavity therein, and forcing air under superatmospheric pressure from the plunger rearwardly along the external surface of the plunger and out of the glass to prevent sticking of the glass to the plunger when the plunger is withdrawn.

3. In the manufacture of hollow glassware, the method which comprises the steps of delivering a charge of glass to an inverted parison mold, thrusting a plunger downwardly into the upper end of the glass in the mold axially of the mold and in spaced relation with the side walls thereof to force a portion of the glass into the annular space between the lateral surface of the plunger and the adjacent side walls of the mold nearly but not quite to the top of said annular space, withdrawing the plunger so that the space in the glass previously occupied by the plunger remains as an axial cavity in said glass, and applying pressure to an internal portion of the glass at the end of the latter opposite to that provided with said cavity to obliterate said cavity and to provide a hollow parison having a closed bottom portion, said application of pressure being commenced while said cavity remains.

4. In the manufacture of hollow glassware, the method which comprises the steps of delivering a charge of glass to a mold, thrusting a plunger into the glass at one end of the mold axially of the mold and in spaced relation with the side walls thereof to force a portion of the glass into the annular space between the lateral surface of the plunger and the adjacent side walls of the mold, cooling the plunger to prevent sticking of the glass thereto, withdrawing the plunger so that the space in the glass previously occupied by the plunger remains as an axial cavity in said glass, and applying pressure to an internal portion of the glass at the end of the latter opposite to that provided with said cavity to obliterate said cavity and to provide a hollow parison having a closed bottom portion, said application of pressure being commenced while said cavity remains.

5. In the manufacture of hollow glassware, the method which comprises the steps of delivering to a vertically disposed mold a charge of glass of sufficient mass to fill the mold cavity from its lower end only to a level below that of the upper end of the mold cavity, thrusting a plunger axially downward into the glass in the mold to displace glass of the charge in the mold upwardly between the lateral surface of the plunger and the wall of the previously unfilled portion of the mold cavity, withdrawing the plunger while glass thus displaced remains in contact at its outer surface with said side walls of the mold cavity and thus producing an axial cavity in the upper portion of the glass in the mold, and introducing blowing pressure into the glass in the mold at the end thereof opposite that provided with said cavity to displace an internal portion of the glass in the mold axially thereof to obliterate said cavity, said introduction of blowing pressure being commenced while said cavity remains.

6. In the manufacture of hollow glassware, the method which comprises delivering to an inverted parison mold having a neck portion at its lower end a charge of glass of insufficient mass to fill the mold cavity completely from its lower end to its upper end, compacting the glass in the lower end portion of the mold and displacing an internal portion of such glass upwardly against the side walls of the previously unfilled upper portion of the mold cavity nearly but not quite to the top of the latter by thrusting a plunger axially downward into the glass of the mold cavity, withdrawing the plunger while the glass thus displaced remains in contact with the side walls of said upper end portion of the mold cavity and thereby providing an axial cavity in the upper portion of the glass in the mold, and thereafter introducing blowing pressure into the glass in the neck portion of said mold to blow a bubble in the glass in the mold and to force an internal portion of such glass axially of the mold cavity to obliterate said cavity in the glass and to provide a bottom for the resultant hollow glass parison.

7. In the manufacture of hollow glassware, the method which comprises delivering to an inverted parison mold having a neck portion at its lower end a charge of glass insufficient to fill the mold cavity completely from its lower end to its top, compacting the glass in the mold and displacing a portion of such glass upwardly against the walls of the previously unfilled portion of the mold cavity nearly but not quite to the top of the latter by thrusting a plunger axially downward into the glass in the mold, withdrawing said plunger while glass thus displaced remains in contact with the side walls of said upper portion of the mold cavity, thus producing an axial cavity in the glass in the upper portion of said mold cavity, permitting the surface of the cavity in the glass in the mold to reheat after said cavity forming operation, and introducing blowing pressure into the glass in the neck portion of said mold to displace an internal portion of such glass axially against a baffle at the opposite end of the mold to obliterate said cavity in the glass and to provide a hollow parison having a bottom portion.

8. In the manufacture of hollow glassware, the method which comprises delivering to an inverted parison mold having a neck portion at its lower end a charge of glass insufficient to fill the mold cavity completely from its lower end to its top, compacting the glass in the mold and displacing a portion of such glass upwardly against the walls of the previously unfilled portion of the mold cavity by thrusting a plunger axially downwardly into the glass in the mold, withdrawing said plunger while glass thus displaced remains in contact with the side walls of said upper portion of the mold cavity, thus producing an axial cavity in the glass in the upper portion of said mold cavity, permitting the wall of said cavity in the glass in the mold to reheat after said cavity forming operation, introducing blowing pressure into the glass in the neck portion of said mold to displace an internal portion of such glass axially against a baffle at the opposite end of the mold to obliterate said cavity in the glass and to provide a hollow parison having a bottom portion, transferring said parison to a final blow mold, and blowing out said parison in said final blow mold to form the finally blown article.

9. In apparatus for the manufacture of articles of hollow glassware a parison mold disposed in inverted or neck-down position for the reception of a charge of glass, a plunger adapted to be projected downwardly into the glass in the mold to displace a portion of said glass upwardly in the space between the plunger and the adjacent walls of the mold and thereby to produce an open-ended cavity in one end of the glass in the mold, means for operating said plunger to project it downwardly into the glass and to withdraw it from the glass, in such a manner as to produce said cavity in the glass, means for producing an initial blow cavity in the glass in the mold at the end thereof opposite to that provided with said first named cavity, a baffle for the end of the mold from which said plunger has been withdrawn, means for applying said baffle to the mold after the withdrawal of said plunger, and means for applying blowing pressure to said initial blow cavity while said first-named cavity persists and after the application of said baffle to obliterate said first-named cavity by forcing an internal portion of the glass in the mold longitudinally thereof until the surface of said first-named cavity has been displaced outwardly against said baffle.

10. In the manufacture of an article of hollow glassware by the use of apparatus including a parison mold having an end portion for forming the neck of the article to be made, said end portion being lowermost when the mold receives its charge, and a pin adapted to be projected into said neck forming portion of the mold in spaced relation with the walls thereof and subsequently withdrawn to leave an initial blow aperture in the glass in the neck forming portion of the mold, the method which comprises, applying a funnel to the upper end of the inverted mold to guide a charge of glass for the mold downwardly into the mold cavity, thrusting a plunger downwardly through said funnel into the glass in the mold to displace upwardly a portion of such glass to form an annulus of glass between the plunger and the adjacent walls of the mold and in contact with the latter, withdrawing the plunger to vacate the cavity within said annulus of glass, removing said funnel, applying a baffle to the end of the mold from which said funnel has been removed, and introducing blowing pressure into the initial blow aperture in the glass in the neck-forming end portion of the mold while said annulus of glass in the opposite end of the mold remains in contact with the walls thereof, said blowing pressure acting to obliterate the cavity within said annulus of glass by expanding the glass in the mold into contact with said baffle.

ARTHUR EDGAR SMITH.